(12) United States Patent
Tokuda et al.

(10) Patent No.: US 8,054,991 B2
(45) Date of Patent: Nov. 8, 2011

(54) SOUND PICKUP APPARATUS AND CONFERENCE TELEPHONE

(75) Inventors: Toshimichi Tokuda, Fukuoka (JP); Ryota Fujii, Fukuoka (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 12/424,842

(22) Filed: Apr. 16, 2009

(65) Prior Publication Data

US 2009/0268899 A1 Oct. 29, 2009

(30) Foreign Application Priority Data

Apr. 17, 2008 (JP) ................................ P2008-107674

(51) Int. Cl.
*H04R 3/00* (2006.01)
(52) U.S. Cl. .......................................... 381/92; 381/122
(58) Field of Classification Search .................. 381/92, 381/94.1, 94.5, 122, 56; 379/202.01, 406.04, 379/428.02, 420.023
See application file for complete search history.

(56) References Cited

U.S. PATENT DOCUMENTS

| | | | | |
|---|---|---|---|---|
| 4,184,048 A | * | 1/1980 | Alcaide | 379/388.02 |
| 4,658,425 A | * | 4/1987 | Julstrom | 381/81 |
| 5,121,426 A | | 6/1992 | Baumhauer, Jr. et al. | |
| 5,625,697 A | * | 4/1997 | Bowen et al. | 381/92 |
| 2002/0031234 A1 | | 3/2002 | Wenger et al. | |
| 2005/0185797 A1 | * | 8/2005 | Klein et al. | 381/59 |
| 2005/0286696 A1 | * | 12/2005 | Bathurst et al. | 379/202.01 |
| 2005/0286697 A1 | * | 12/2005 | Bathurst et al. | 379/202.01 |
| 2005/0286698 A1 | * | 12/2005 | Bathurst et al. | 379/202.01 |
| 2006/0018267 A1 | | 1/2006 | Kobayashi et al. | |
| 2006/0269080 A1 | * | 11/2006 | Oxford et al. | 381/92 |
| 2008/0031234 A1 | * | 2/2008 | Sbisa et al. | 370/360 |
| 2008/0205665 A1 | | 8/2008 | Tokuda et al. | |

FOREIGN PATENT DOCUMENTS

| | | |
|---|---|---|
| EP | 1453349 | 9/2004 |
| JP | 3-293846 | 12/1991 |
| JP | 2002-159086 | 5/2002 |

OTHER PUBLICATIONS

English language Abstract of JP 2002-159086, May 31, 2002.
English language Abstract of JP 3-293846, Dec. 25, 1991.

* cited by examiner

*Primary Examiner* — Davetta W Goins
*Assistant Examiner* — Phylesha Dabney
(74) *Attorney, Agent, or Firm* — Greenblum & Bernstein, P.L.C.

(57) ABSTRACT

A sound pickup apparatus includes a plurality of microphones, and a controller that receives signals from the plurality of microphones. When the controller detects a failure in one of the plurality of microphones based on the signals received from the plurality of microphones, the controller restricts a signal from at least one remaining non-failure microphone.

5 Claims, 18 Drawing Sheets

FIG. 3
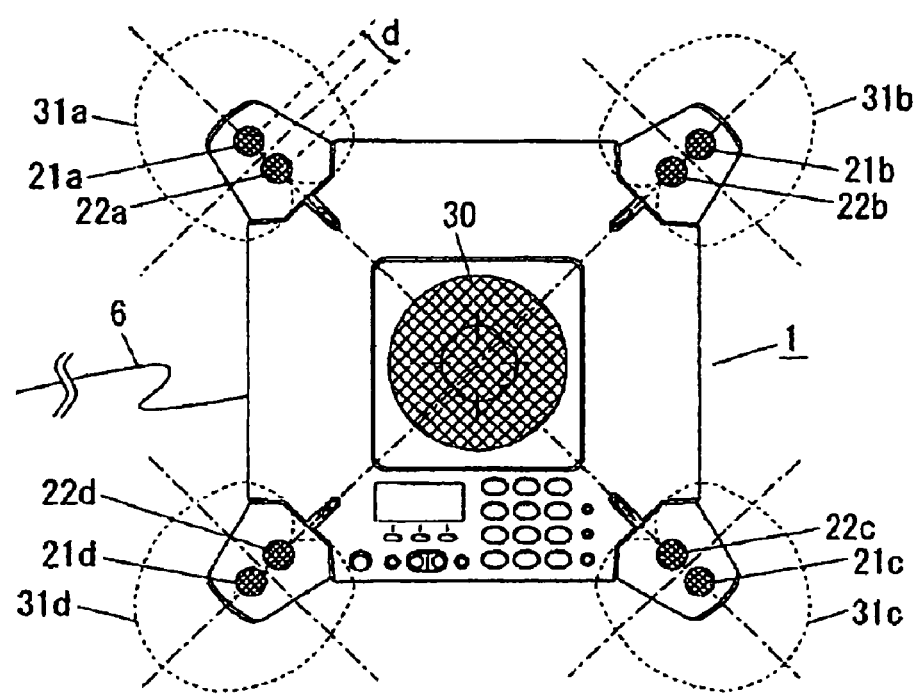

SOUND PICKUP APPARATUS AND CONFERENCE TELEPHONE

BACKGROUND

The present invention relates to a sound pickup apparatus for picking up a user's voice and a conference telephone equipped with the sound pickup apparatus, to enable establishment of a voice conference between remote locations.

A recently-developed sound pickup apparatus of microphone array type has a plurality of microphones and obtains a desired directivity pattern by subjecting signals output from the microphones to digital signal processing, and is built in various products.

A problem of such a microphone array is that it breaks down with a higher probability when compared with a sound pickup apparatus equipped with single microphone. JP-A-2002-159086 has been proposed as a countermeasure to the problem.

A summary of JP-A-2002-159086 will be described by reference to FIG. 19. The sound pickup apparatus has microphone units 12a to 12d. A failure diagnosis processing section 13 individually diagnoses a failure in each of the microphone units 12a to 12d. In accordance with a signal output from the failure diagnosis processing section 13, a normal microphone selection processing section 14 outputs only sound signals detected by the microphone units 12a to 12d that have been diagnosed as being normal. Subsequently, the voice signals are delayed by delay processing sections 15a to 15d, and the thus-delayed signals are output after having undergone delay-and-sum processing performed by an addition processing section 16. Thereby, a processed, noise-eliminated signal is output from the addition processing section 16. From the above, the sound pickup apparatus is configured so as to stably operate as a sound detector.

In the meantime, a conference telephone is mentioned as an example product equipped with a sound pickup apparatus. As in JP-A-3-293846, a typical example product is a conference telephone includes a microphone that converts audible sound into an electric signal, a loud speaker that converts the electric signal into audible sound, and a sound communications network that electrically connects the microphone and the loud speaker to a telephone line. The microphone has a directivity pattern in which a sensitivity of a sound emitted from at least one direction is greater than that of sounds emitted from the other directions. The reason why the sound pickup apparatus built in the conference telephone is imparted with such a directivity pattern is to reduce an acoustic echo which will be caused as a result of received voice reproduced by a speaker re-entering the microphone and being transmitted to a party on the other end. The acoustic echo itself is unpleasant and impairs call quality. In addition, when the acoustic echo is extremely large, howling may occur, to thus disable the call.

However, when a conference telephone is equipped with a microphone array for the purpose of reducing the acoustic echo, individually disconnecting a signal output from a broken microphone under the technique described in JP-A-2002-159086 may lead to output of an insufficiently-canceled signal component of the acoustic echo, which may in turn result in an increase in the acoustic echo.

SUMMARY

The present invention has been conceived in the circumstance and aims at providing a sound pickup apparatus and a conference telephone that enable reduction of an increase in the acoustic echo caused by a failure in a microphone.

To solve the problem, the present invention provides a sound pickup apparatus comprising:

a plurality of microphones; and a controller that receives signals from the plurality of microphones respectively, wherein when the controller detects a failure in one of the plurality of microphones based on the signals received from the plurality of microphones, the controller restricts a signal from at least one remain non-failure microphone.

By the above configuration, when the failure in one of the plurality of microphones is detected, the controller controls the signal from the at least one remain non-failure microphone. Therefore, an increase in acoustic echo and a deterioration of sound collection performance, which are caused by a reduction of the number of non-failure microphones, can be lessened

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a layout of components of the conference telephone of the first embodiment of the present invention;

DETAILED DESCRIPTION OF EXEMPLARY EMBODIMENTS

Embodiments of the present invention will be described hereinbelow by reference to the drawings.

First Embodiment

Figure 1:
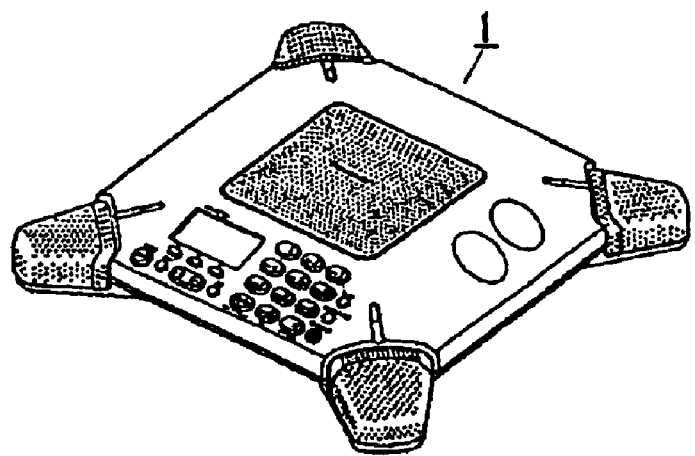
FIG. 1 is a perspective view of a conference telephone of a first embodiment of the present invention.
Figure 2:
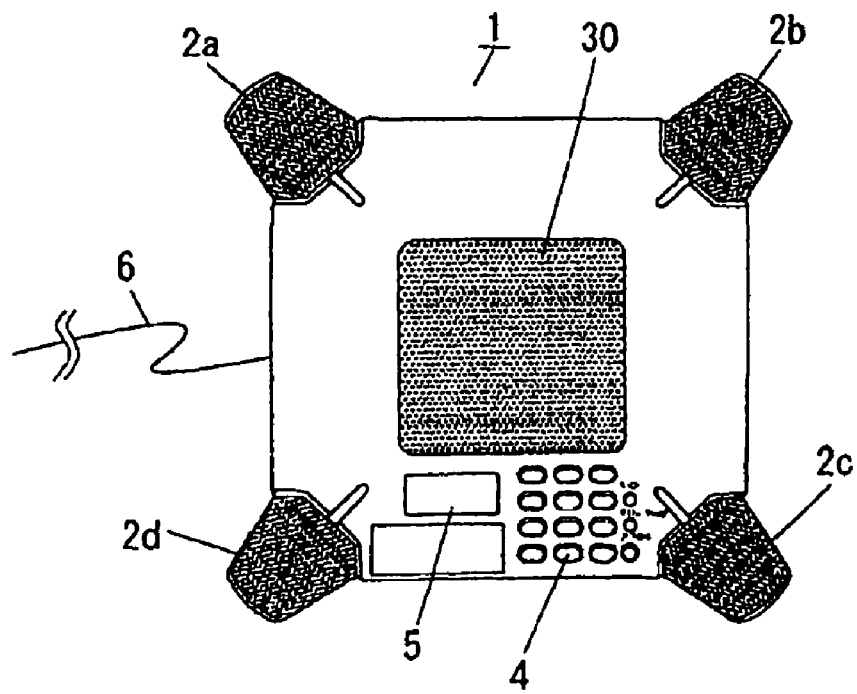
FIG. 2 is a top view of the conference telephone of the first embodiment of the present invention.

FIG. 1 is a perspective view of a conference telephone of a first embodiment of the present invention, and FIG. 2 is a top view of the conference telephone of the first embodiment of the present invention, which is achieved when the conference telephone shown in FIG. 1 is viewed from its top surface.

In FIG. 2, reference numeral 1 designates a conference telephone; 2a to 2d designate sound pickup sections for picking up users' voices; 30 designates a speaker that reproduces received voices; 4 designates operation buttons for operations, such as making-call/answering-call operations and various setting operations, are performed; 5 designates a display device that displays the status of a conversation and settings; and 6 designates a communication cable. The communication cable 6 includes one type or a plurality of types of communication cables according to communication units, such as a telephone line or the Ethernet (registered trademark). Mutually-separated two conference telephones or more are connected together by the communication units by exclusively or simultaneously using the cables.

The conference telephone of the present embodiment shown in FIGS. 1 and 2 is configured so as to transmit only voices of users of the conference telephone input to respective sound pickup sections (corresponding to 2a to 2d of the conference telephone shown in FIG. 2) and minimize transmission of a so-called acoustic echo signal resulting from entry of a signal reproduced by a built-in speaker (corresponding to a speaker 30 of the conference telephone shown in FIG. 2) of the conference telephone into a microphone. The reason for this is that transmission of an acoustic echo results in articulation deterioration of a communication and that when the acoustic echo is large, howling occurs, thereby rendering a conversation impossible. In the present embodiment, the conference telephone is equipped with a microphone array as a sound pickup section for such a purpose.

FIG. 3 is a drawing of the layout of components in the conference telephone of the present embodiment, showing an example in which four microphone array sets, each of which includes two microphone elements, are provided. Microphones 21a and 22a, 21b and 22b, 21c and 22c, and 21d and 22d are arranged along four directions while separated from each other at 90 degrees around the speaker 30. The microphones 21 and 22 pairing up with each other are arranged along an extension of the speaker 30 while being separated from each other at a constant interval. A curve represented by a dotted line 31a denotes a sensitivity distribution complying with the direction of a microphone consisting of the two microphones 21a and 22a, or a directivity pattern thereof; a curve represented by a dotted line 31b denotes a sensitivity distribution complying with the direction of a microphone consisting of the two microphones 21b and 22b, or a directivity pattern thereof; a curve represented by a dotted line 31c denotes a sensitivity distribution complying with the direction of a microphone consisting of the two microphones 21c and 22c, or a directivity pattern thereof; and a curve represented by a dotted line 31d denotes a sensitivity corresponding to an angle between a picking up direction and the direction of a microphone consisting of the two microphones 21d and 22d, or a directivity pattern thereof. It is intended to attenuate an acoustic echo entering the microphones by designing a directivity pattern in such a way that the sensitivity of an incoming acoustic signal from the direction of the speaker 30 becomes relatively low.

Figure 4:
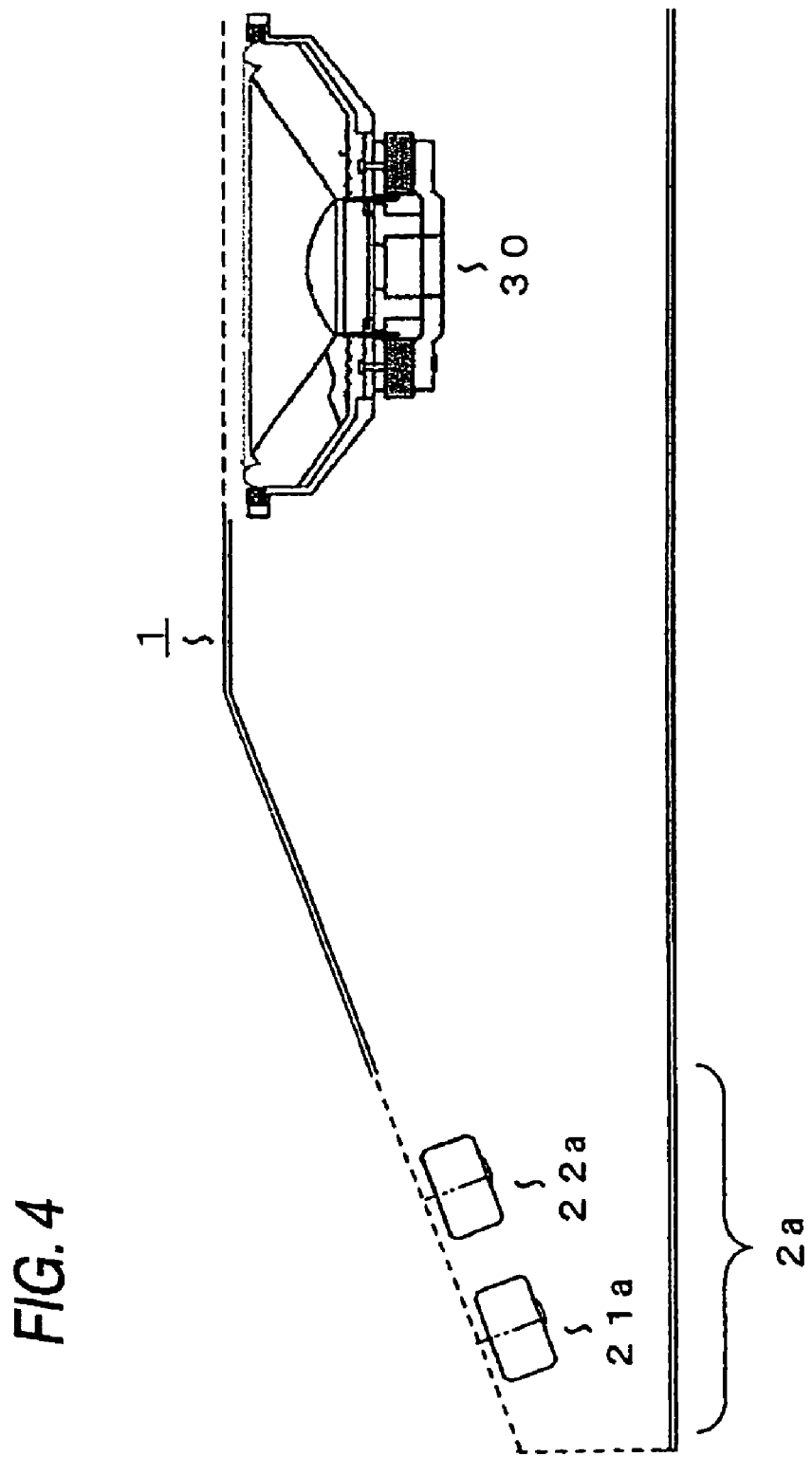
FIG. 4 is a cross-sectional view showing the layout of microphone arrays.
Figure 5:
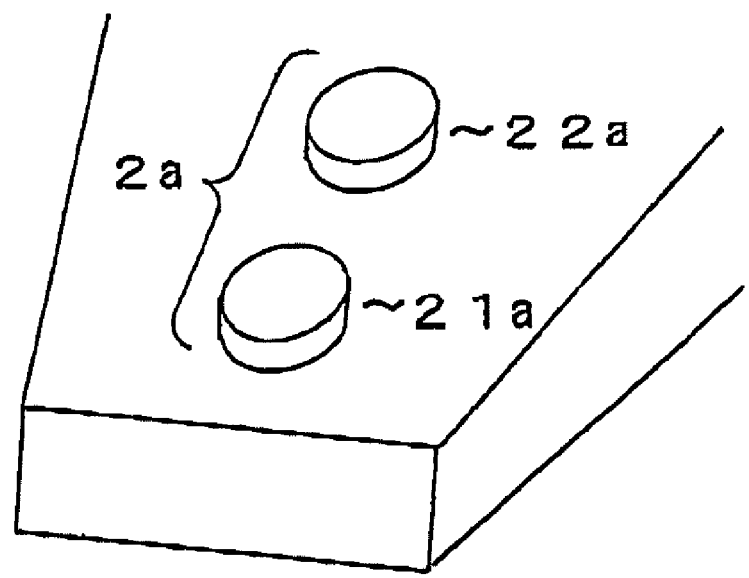
FIG. 5 is a perspective view showing the layout of the microphone arrays.

The microphone array of the conference telephone of the first embodiment of the present invention will be described in detail. In FIG. 3, the second microphone 22a among the microphones 21a and 22a is placed closer to the speaker 30 than the first microphone 21a by a distance "d." FIG. 4 shows a cross-sectional view representing the layout of a microphone array. The speaker 30 and the microphones 21a and 22a are arranged within the conference telephone 1. The microphones 21a and 22a are covered with a meshed cover so as to prevent the user from directly touching the microphones. Moreover, as shown in FIG. 5, the microphones 21a and 22a are upwardly mounted. The same also applies to the microphone set consisting of the two microphones 21b and 22b, the microphone set consisting of the two microphones 21c and 22c, and the microphone set consisting of the two microphones 21d and 22d, respectively.

In the present embodiment, a distance "d" between two microphones is set to about a quarter-wavelength of the upper limit of a frequency that can be transmitted in a signal range where conversation is established, as indicated by (Equation 1). Sound velocity "c" achieved in the air is usually 340 m/sec. When the upper limit frequency is 7 kHz, the microphone interval "d" comes to about 12 mm.

$$d \approx c/2Fs = c/4f = (1/4)\lambda \qquad \text{(Equation 1)}$$

c: sound velocity achieved in the air

Fs: a sampling frequency used for processing input signals respectively from each microphone set consisting of two microphones 21a and 22a to 21d and 22d f: Maximum processing frequency $\lambda$: a wavelength at "f"

An explanation is now given to signal processing for generating a directivity pattern that reduces sensitivity achieved in the direction of the speaker 30, as indicated by directivity patterns 31a to 31d shown in FIG. 3, by the two-element microphone array having the foregoing component layout. The delay time of the delay filter 85a, among the delay filters 84a and 85a shown in FIG. 7, closer to the speaker is set so as to become greater than that of the delay filter 84a in terms of a duration, and a difference $\tau'$ between the delay times is set as represented by (Equation 2).

$$\tau' = d/c = 1/2Fs = 1/4f \qquad \text{(Equation 2)}$$

$\tau'$: a difference between the delay time of a delay filter 84a and the delay time of a delay filter 84b Specifically, when a waveform having one sampling frequency 1/Fs and a waveform of the maximum processing frequency "f" is input, a time difference equivalent to the duration of a quarter-wavelength is provided. As a result of passing through the delay filters 84a and 85a, signal components stemming from arrival of an acoustic echo from the speaker 30 at the respective microphones 21a and 22a become equal to each other in terms of a phase. Acoustic echo in a signal output from a subtraction section 86a becomes attenuated as a result of cancellation of a signal component of the acoustic echo. A load of echo cancellation processing of a DSP 50 is consequently reduced, so that full duplex communication operation becomes possible. The conference telephone 1 of the present embodiment has four microphone array sets. However, the number of microphone array sets is not limited to four. A case where two microphone array sets are disposed on both sides of the speaker 30, a case where three microphone array sets or more are radially arranged can also be implemented likewise. Use of a non-directional microphone for each of the microphones is desirable.

The delay filter performs a delaying operation which is a non-integral multiple of the sampling frequency when the delay time of the delay filter is not an integral multiple of the sampling frequency.

US 2008/0205665A1 is incorporated herein by reference in connection with a system for generating a desired directivity pattern by use of the microphones.

Figure 6:
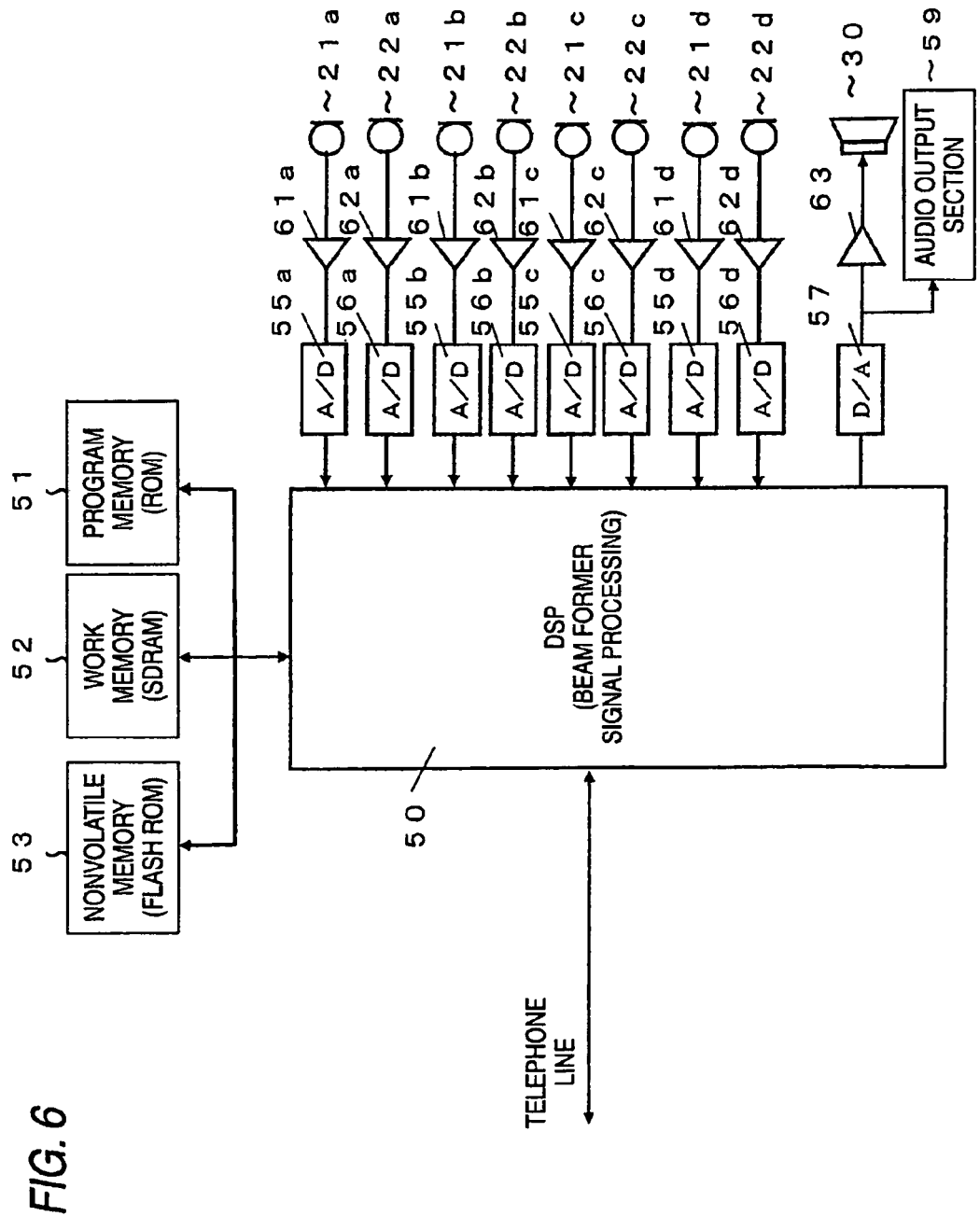
FIG. 6 is a block diagram of hardware of the conference telephone of the first embodiment of the present invention.

FIG. 6 is a hardware block diagram regarding the conference telephone of the first embodiment of the present invention. In FIG. 6, reference numeral 50 designates a DSP (Digital signal processor) for performing various signal processing operations; 51 designates a program memory that stores program software for causing the DSP 50 to perform various signal processing operations; 52 designates a work memory required for the DSP 50 to run various programs stored in the program memory 51; and 53 designates a nonvolatile memory for recording a processing result of the DSP, and the like.

The DSP 50 is connected to ADC (Analog-to-Digital converter) sections 55a to 55d, 56a to 56d and a DAC (Digital-to-Analog converter) section 57 via a timing control PLD (Programmable Logic Device). The sets of two microphones 21a and 22a, 21b and 22b, 21c and 22c, and 21d and 22d are connected to the ADC sections 55a to 55d, 56a to 56d via microphone drive circuit 61a to 61d and 62a to 62d respectively.

In the above configuration, analog signals input to the microphone sections are digitized by the ADC sections 55a to 55d and 56a to 56d. Subsequently, the signals undergo processing in the DSP 50 for canceling an echo occurring between the microphone and the speaker. The thus-processed signals are converted into an analog signal by the DAC section 57 and output to an audio output section 59.

The DSP 50 acts as a controller that outputs a voice of the other party to the speaker 30; that inputs both voices; namely, a voice of the other party output from the speaker 30 and voices for the conference telephone collected by the microphone sets 21a and 22a, 21b and 22b, 21c and 22c, and 21d and 22d; and that controls echo cancellation for canceling the voice of the other party output from the speaker 30.

In the above configuration, analog signals input to the microphone section are sampled and quantized by the ADC sections 55a to 55d and 56a to 56d. Subsequently, the thus-sampled-and-quantized signals are subjected to beam-forming digital signal processing (directional control) in the DSP 50, whereupon a resultant signal is output from the DSP.

Figure 7:
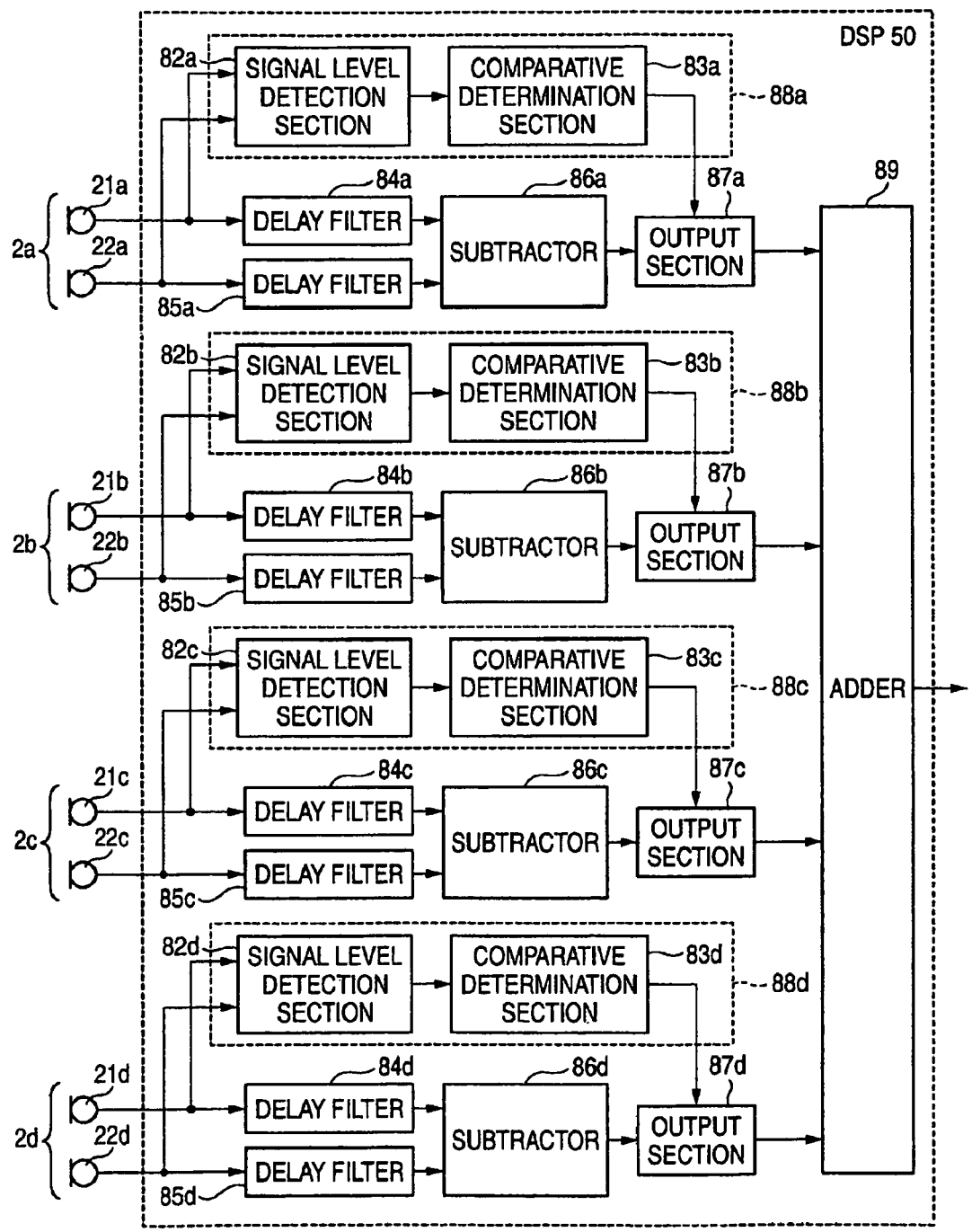
FIG. 7 is a functional block diagram of a sound pickup apparatus of the first embodiment of the present invention.

Signal processing configurations of the microphone arrays built in the conference telephone of the first embodiment of the present invention are described by reference to FIG. 7. The conference telephone shown in FIG. 7 is equipped with four microphone arrays respectively having the microphone set 21a and 22a, the microphone set 21b and 22b, the microphone set 21c and 22c, and the microphone set 21d and 22d. Descriptions are provided by taking, by way of example, a microphone array 2a consisting of two elements; namely, the microphones 21a and 22a. The microphone array 2a includes delay filters 84a and 85a, a subtractor 86a, an output section 87a, and a failure detection section 88a. The same configuration also applies to the other three microphone array sets 2b to 2d. The microphone array 2b also includes delay filters 84b and 85b, a subtractor 86b, an output section 87b, and a failure detection section 88b. The microphone array 2c also includes delay filters 84c and 85c, a subtractor 86c, an output section 87c, and a failure detection section 88c. The microphone array 2d also includes delay filters 84d and 85d, a subtractor 86d, an output section 87d, and a failure detection section 88d. One adder 89 common to the microphone array sets 2a to 2d is provided.

In FIG. 6, the DSP 50 causes the delay filters 84a to 84d and 85a to 85d, the subtraction sections 86a to 86d, the signal level detection sections 82a to 82d, comparative determination sections 83a to 83d, and the output sections 87a to 87d in the operating block shown in FIG. 7 to operate, by use of signals input to the DSP 50 via the ADCs 55a to 55d or 56a to 56d shown in FIG. 6.

A configuration and detailed operations of the failure detection section shown in FIG. 7 will be specifically described. In FIG. 7, failure-detecting operations performed by the four microphone array sets 2a to 2d are totally identical with each other; hence, the microphone array is described while its alphabetical suffix is omitted (e.g., the failure detection section 88a is described as 88). The failure detection section 88 includes a signal level detection section 82 and a comparative determination section 83. The signal level detection section 82 individually computes levels of signals input to the microphones 21 and 22. The comparative determination section 83 compares levels of signals output from the respective microphones with a specified value. When the level of the signal output is smaller than the specified value, the microphone is determined as a failure.

The delay filters 84 and 85 delay signals from the microphones 21 and 22 in such a way that acoustic echo signals arriving at the microphones from the direction of the speaker become equal to each other in terms of a phase. The subtractor 86 subtracts the other signal from one signal, thereby computing a differential signal whose acoustic echo is canceled. When the failure detection section 88 does not detect any failure in the microphones 21 and 22, the output section 87 outputs the differential signal computed by the subtractor 86 to the adder 89. When a failure is detected in at least one of the microphones 21 and 22, the differential signal is interrupted.

The adder 89 adds up the signals output from the output sections of the respective output section 87a to 87d, and sends a result of addition. In the microphone array, when one of the microphone set consisting of two microphone has become broken, the subtractor 86a can reduce the potential of an increase in acoustic echo, which is caused when an acoustic echo component of a signal from one remaining normal microphone is not completely cancelled.

There will be described an inspection process employed during production of the conference telephone 1 and operation carried out when the user takes action intended for inspection.

An acoustic signal transmission section 5c loads an acoustic signal stored in the nonvolatile memory 53 by the DSP 50 and outputs a signal waveform to a DAC 57 via a PLD. The signal waveform is amplified by a speaker amplifying circuit 63, whereupon the speaker 30 reproduces the acoustic signal.

Figure 8:
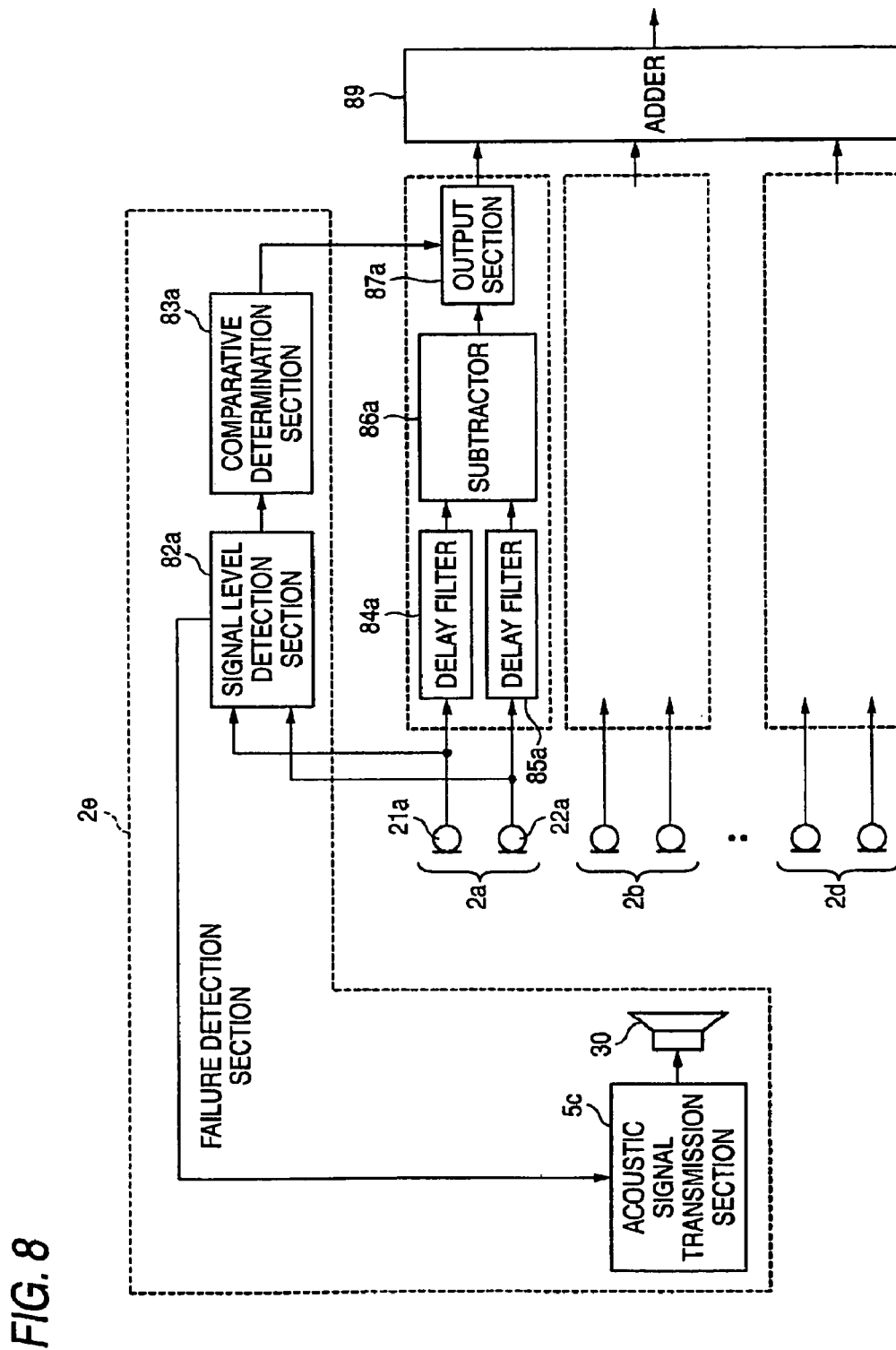
FIG. 8 is a processing block diagram of the conference telephone of the first embodiment of the present invention.

Specific operation of a failure detection section 2e and that of an output section 87a, both of which are shown in FIG. 8, will be described by reference to a flowchart shown in FIG. 9. The microphone array 2a is now described; however, the same also applies to the microphone array 2b, the microphone array 2c, and the microphone array 2d.

At the outset, detection of a failure in the microphone is initiated in an inspection process during production of the conference telephone 1 or by user's operation, and the signal level detection section 82a sends a command to the acoustic signal transmission section 5c (Step 1). Next, the acoustic signal transmission section 5c loads the acoustic signal stored in the nonvolatile memory 53 and transmits the thus-loaded signal to the speaker 30. A tone signal having a specific frequency of the order of 1 kHz, white noise, and the like, can be utilized for the acoustic signal (Step 2). Next, the acoustic signal is reproduced by the speaker 30 (Step 3).

Next, the signal level detection section 82a computes a signal level for one microphone. A time-average absolute value of a signal waveform, a time-average value of power having a squared amplitude value, an RMS value, and the like, are used as a signal level (Step 4).

The comparative determination section 83a compares the signal level computed by the signal level detection section 82a with a specified value. The specified value is previously set as a signal level that is to be detected by the signal level detection section 82a in the middle of reproduction of an acoustic signal from the speaker when the microphone is normal (Step 5). When the signal level is smaller than the specified value, the comparative determination section 83a determines that the microphone is failure (Step 6). In contrast, when the signal level is larger than the specified value, the comparative determination section 83a determines that the microphone is normal (Step 7). When evaluation for all microphones have not been finished, processing returns to Step 4, and the evaluation is repeated until the evaluations for the all microphones have been finished (Step 8). When a failure is detected in one or more of the microphones of the microphone array, an output section 87a connected to the microphone array having a failure microphone interrupts a differential signal output from the subtractor 86a (Step 9). Reproduction of an acoustic signal is stopped, so long as above-mentioned processing completes (Step 10). Processing for detecting a failure in the microphone is completed (Step 11).

The first embodiment of the present invention implemented above lies in that, in the case of a conference telephone equipped with a plurality of microphone arrays as shown in FIG. 3, even when an output from one microphone set is interrupted as a result of the microphone array set having a failure microphone, conversation can be continued by using a remaining signal output from the microphone array. In this case, sensitivity to voices of a user situated in the direction of the interrupted microphone array is deteriorated. However, a problem of an increase in acoustic echo signal, which is caused as a result that a signal from the failure microphone array is continually output, can be prevented.

The adder 89 shown in FIG. 8 equally mixes signals output from the plurality of microphone arrays, thereby producing an output signal. However, another method is to compensate for a decrease in sound level when remaining signals are added as a result of interruption of one signal from the microphone array, thereby reducing the influence of a failure. For instance, when one of four microphone arrays becomes a failure, remaining three signals are added and amplified to four-thirds of a normal sound level, there can be produced a transmission speech sound level that is substantially the same as that achieved when four signals are added.

Still another method is to provide the conference telephone with a signal selection section in place of the adder 89. The signal selection section selects and outputs one signal exhibiting the highest signal level among signals output from a plurality of microphone arrays. In this case, a signal from a failure microphone array whose output is interrupted is not automatically selected, hence, influence on a transmission speech signal can be reduced.

Second Embodiment

Figure 10:
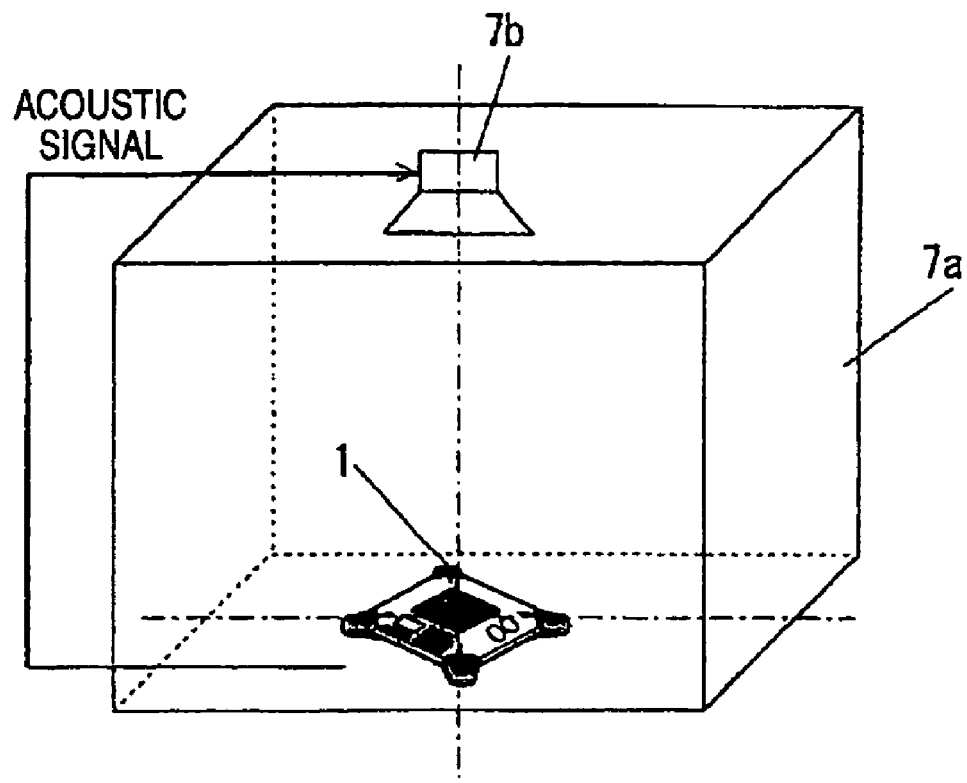
FIG. 10 is an external view of a failure detection section of a second embodiment of the present invention.

In a second embodiment of the present invention, the conference telephone 1 is accommodated in a cubic soundproof box 7a as shown in FIG. 10 instead of the conference telephone of the first embodiment shown in FIG. 8 using the built-in speaker 30, and a failure is detected by use of an external speaker 7b positioned on a ceiling of the soundproof box 7a. The acoustic signal transmission section 5c transmits an acoustic signal to the external speaker 7b. The external speaker 7b is placed at, for instance, the center of the ceiling surface of the soundproof box situated on the vertical line passing through the center of the conference telephone. Since the conference telephone 1 is situated at the center of the bottom of the soundproof box, the external speaker 7b is situated immediately above the conference telephone.

As above, since distances between the microphones and the external speaker 7b of the conference telephone 1 become substantially equal to each other, a failure can be detected without being affected by the distance from an external sound source to the microphones. When the conference telephone reproduces an acoustic signal by use of the built-in speaker 30, variations may arise in signal level depending on a propagation channel in a housing along which the acoustic signal reaches the microphone, which may in turn deteriorate the accuracy of detection of a failure. However, it is possible to reduce the foregoing influence by using the soundproof box 7a and the external speaker 7b, therefore, a failure in the microphone can be detected with high accuracy.

Figure 9:
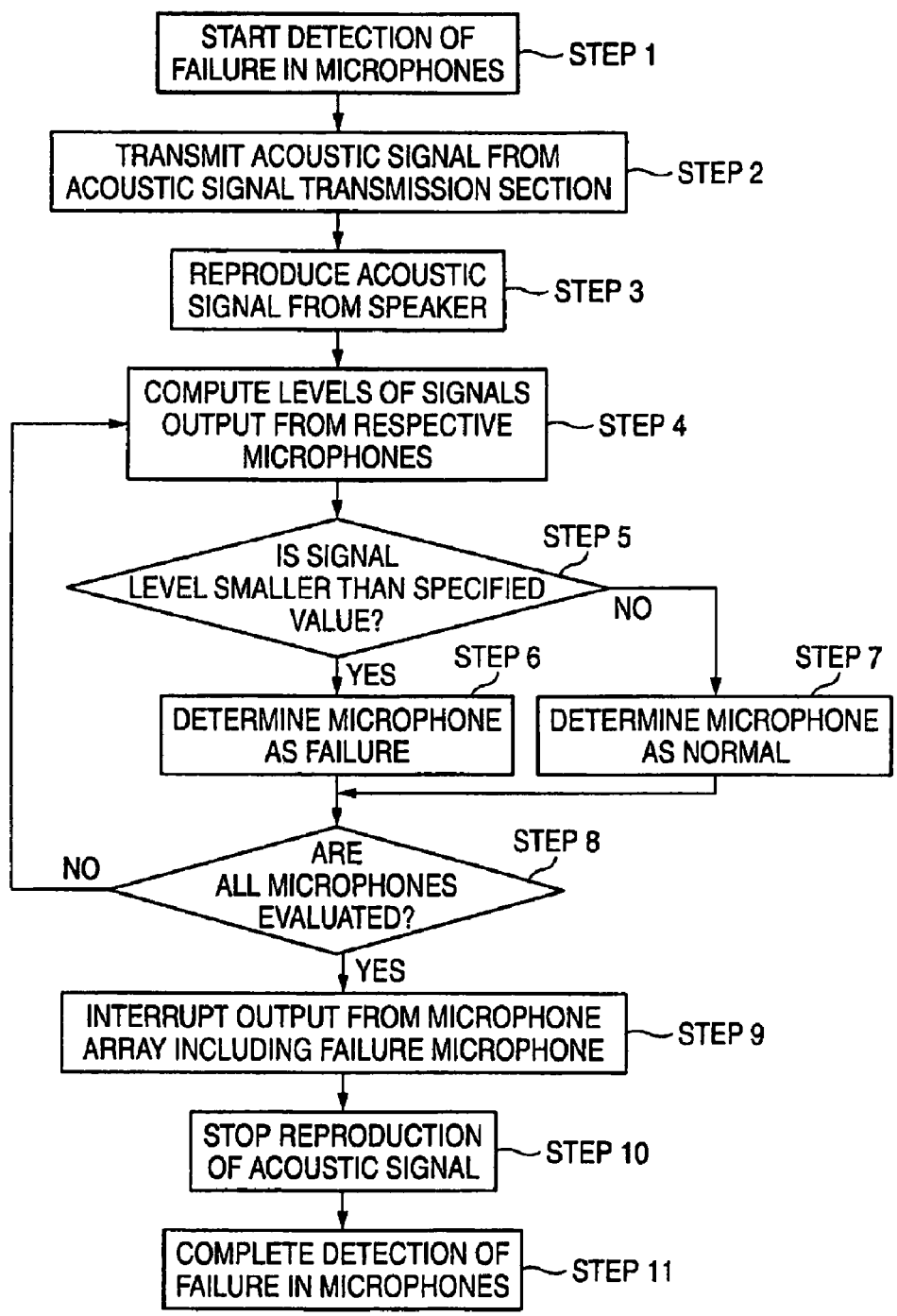
FIG. 9 is an operation flowchart of the first embodiment of the present invention.

Specific operation performed in the second embodiment of the present invention is analogous to that provided in the flowchart shown in FIG. 9 except that the external speaker 7b reproduces the acoustic signal. In relation to a specified value used for comparison of a signal level in the comparative determination section 83a, if the microphones are normal during the course of an acoustic signal being reproduced by the external speaker 7b, it will be possible to previously measure a signal level detected by the signal level detection section 82a, to thus set a specified value.

Third Embodiment

Figure 11:
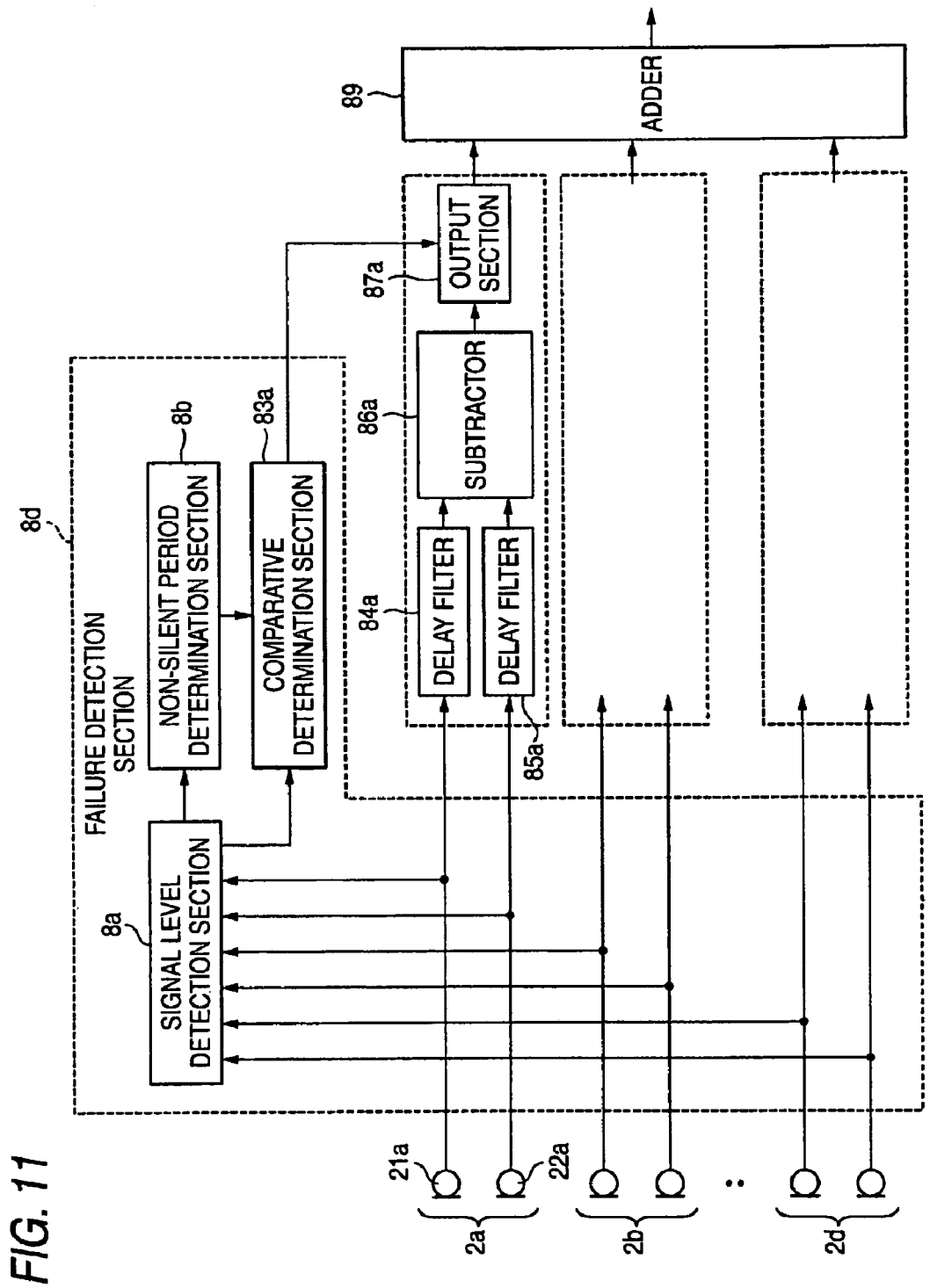
FIG. 11 is a processing block diagram of a conference telephone of a third embodiment of the present invention.

A third embodiment of the present invention will be described by reference to FIG. 11. The present embodiment differs from the first embodiment in that a failure detection section 8d is used instead of the failure detection section 2e. The failure detection section 8d includes a signal level detection section 8a, a non-silent period determination section 8b, and a comparative determination section 83a. The signal level detection section 8a computes signal levels of all microphones 21a and 22a, 21b and 22b, 21c and 22c, and 21d and 22d making up the microphone arrays 2a to 2d, thereby determining a mean value of the signal levels. The non-silent period determination section 8b compares the mean value of the output signal levels of all of the microphones determined by the signal level detection section 8a with a predetermined specified value A, thereby determining whether the present period is a non-silent period or a silent period.

In relation to the microphone array 2a, the comparative determination section 83a compares a specified value B with the output signal levels of respective microphones achieved in the non-silent periods determined by the non-silent period determination section 8b, thereby determining a failure in the microphone. The microphone arrays 2b, 2c, and 2d are also determined likewise. The signal level detection section 8a, the non-silent period determination section 8b, and the comparative determination section 83a are implemented by the DSP 50 shown in FIG. 6.

In contrast to the first embodiment, by means of the configuration, it is not particularly necessary to designate initiation of detection of a failure by user operation. Detection of a failure can be continually performed during a conversation, whereby reliability of the apparatus is enhanced.

Figure 12:
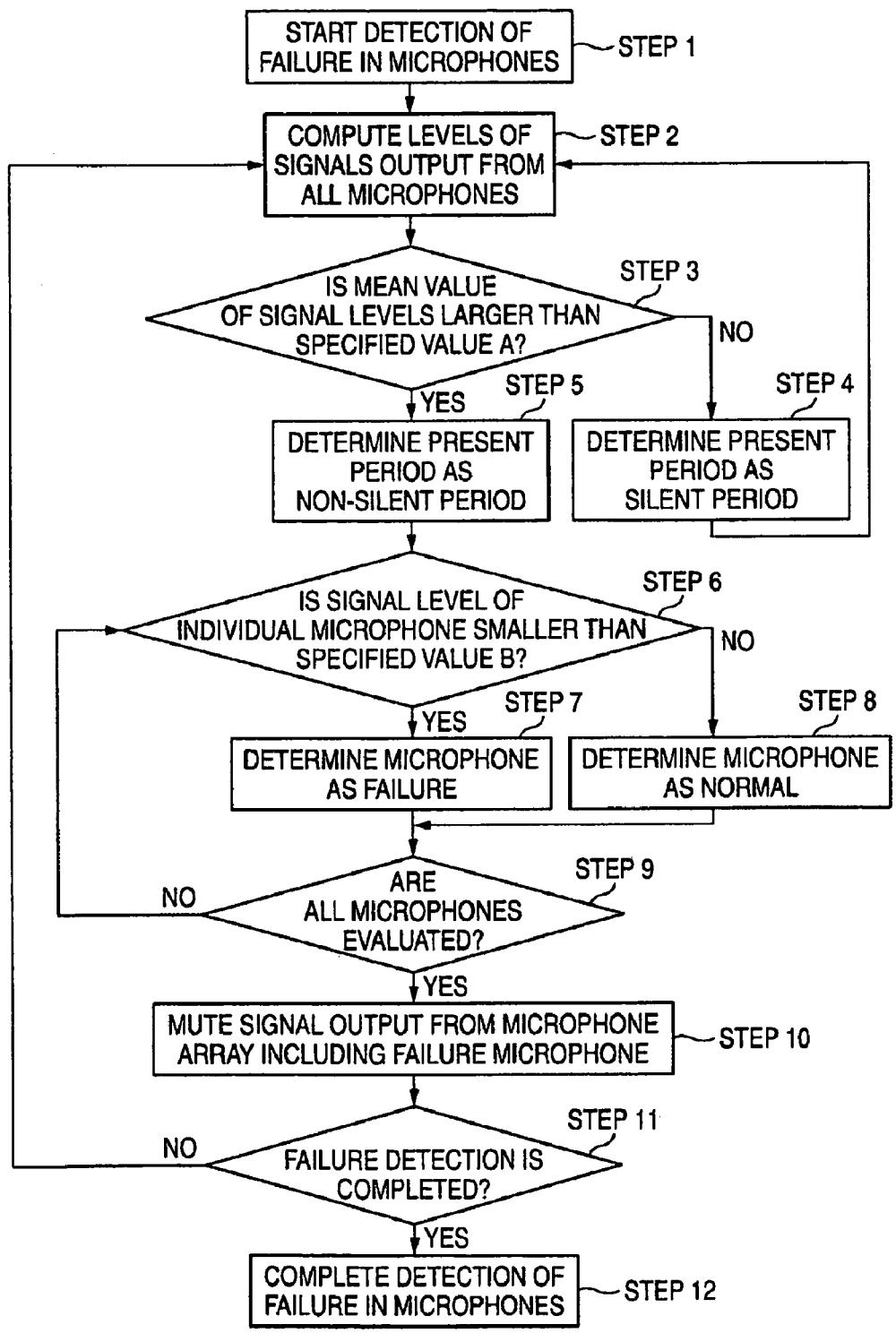
FIG. 12 is an operation flowchart of the third embodiment of the present invention.

An example operation of the third embodiment of the present invention will be described by reference to a flowchart shown in FIG. 12. First, detection of a failure is started. In this case, it is not particularly necessary to designate initiation of failure detection by user operation, and failure detection may also be performed at all times during the conversation (Step 1). Next, the signal level detection section 8a computes a signal level of an individual microphone by use of signals passed to the DSP from all of the microphone (Step 2).

The non-silent period detection section 8b computes a mean value of the output signal levels of all of the microphones and compares the mean value with the specified value A, thereby determining whether or not the present period is the sound-present period. It is possible to differentiate between a non-silent period during which a speaker is talking and the other silent period, by specifying the specified value A to be compared while the magnitude of voices acquired when the user talked to the conference telephone is taken as a standard. Even when the non-silent period includes a period of an acoustic echo signal originating from voices of the other party reproduced by the speaker, the signal does not raise any problem for an object for detecting a failure in a microphone (Step 3). When a result of determination rendered in Step 3 is a silent period, processing returns to Step 2, and processing is repeated (Step 4). If the result of determination rendered in Step 3 is a non-silent period, processing will proceed to Step 6 (Step 5).

Next, in the case of the non-silent period, the comparative determination section 83a compares a signal level of one microphone computed by the signal level determination section 8a with a specified value B. The specified value B is previously set as a signal level, which will be expected to be detected when the microphone is normal in the non-silent period, in contrast with the reference value used for determining the non-silent period (Step 6). If the signal level is smaller than the specified value B, the microphone will be determined to be failure (Step 7). If the signal level is greater than the specified value B, the microphone is determined to be normal (Step 8). Next, if all of the microphone have not been finished undergoing failure detection, processing will return to Step 5. If all of the microphone have been finished undergoing determination, processing will proceed to the next step (Step 9).

When a failure is detected in one or more of the microphones making up the microphone array, an output section 87 of that microphone array interrupts a differential signal from the subtractor 86 (Step 10). When processing for detecting a failure in a microphone is competed, processing proceeds to Step 12. According to the present embodiment, since the user can continue a conversation without concern for operation for detecting a failure in a microphone, failure detection operation can also be continually performed during a conversation at all times (Step 11). Finally, processing for detecting a failure in a microphone is completed (Step 12).

In addition to being previously specified, the specified value B of the signal level used by the comparative determination section 83a may also be set, within the non-silent period determined by the non-silent period determination section 8b, to a value determined by multiplying an average value of output signal levels of all of the microphones by a given proportion. As a result, it is possible to lessen a degree to which the accuracy of determination of a failure in a microphone is influenced by the magnitude of an acoustic signal level achieved within a non-silent period.

Fourth Embodiment

Figure 13:
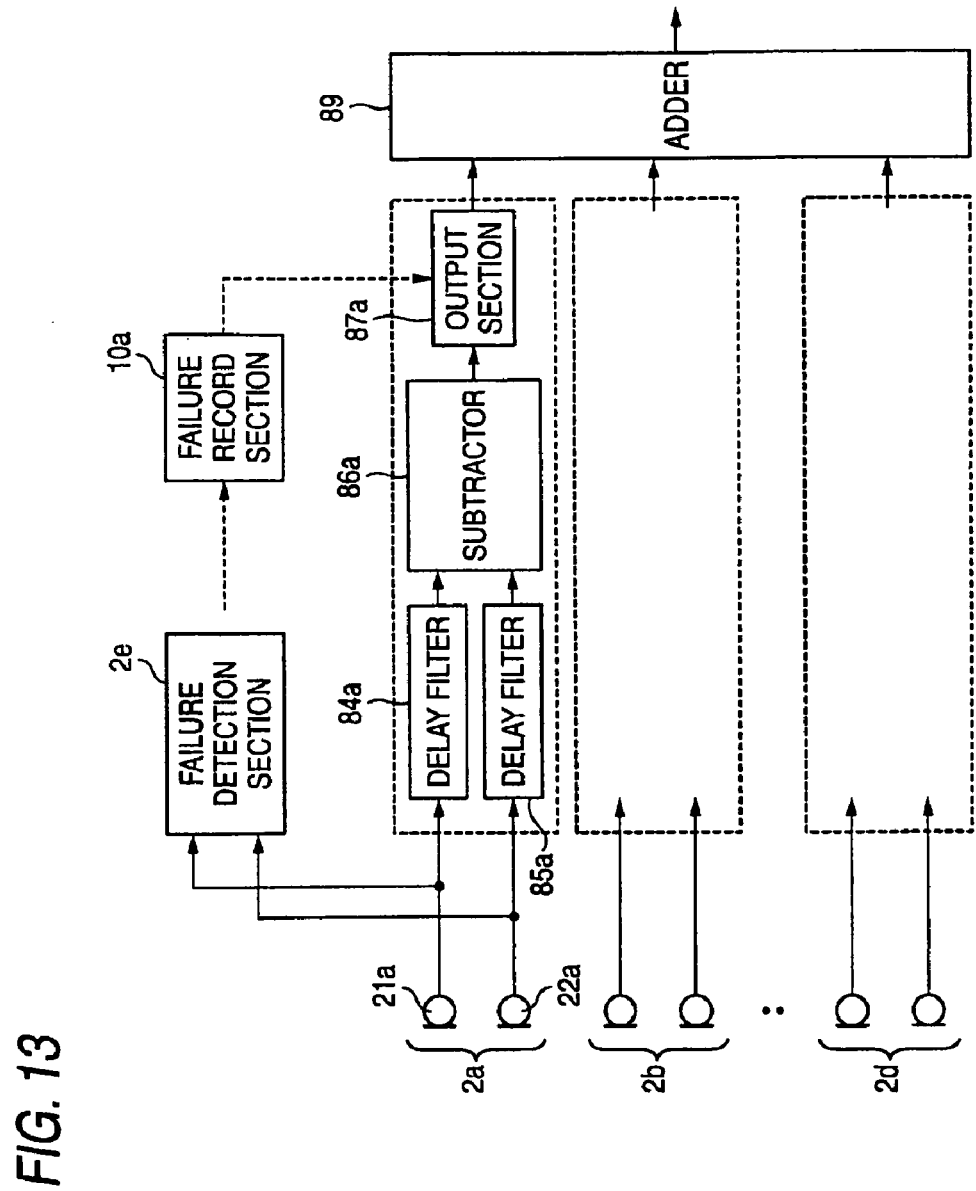
FIG. 13 is a processing block diagram of the conference telephone of a fourth embodiment of the present invention.

A fourth embodiment of the present invention will be described by reference to FIG. 13. The present embodiment differs from the first embodiment in that the conference telephone has a failure record section 10a which records an identification number of a microphone array to which a microphone determined to be failure by the failure detection section 2e; and that the output section 87a interrupts a signal output from a microphone array at the time of initiation of a conversation by reference to an identification number of a microphone array recorded in the failure record section 10a. The failure detection section 2e and the output section 87a are implemented by the DSP 50 shown in FIG. 4, and the failure record section 10a is implemented by the nonvolatile memory 53 shown in FIG. 6.

Figure 14:
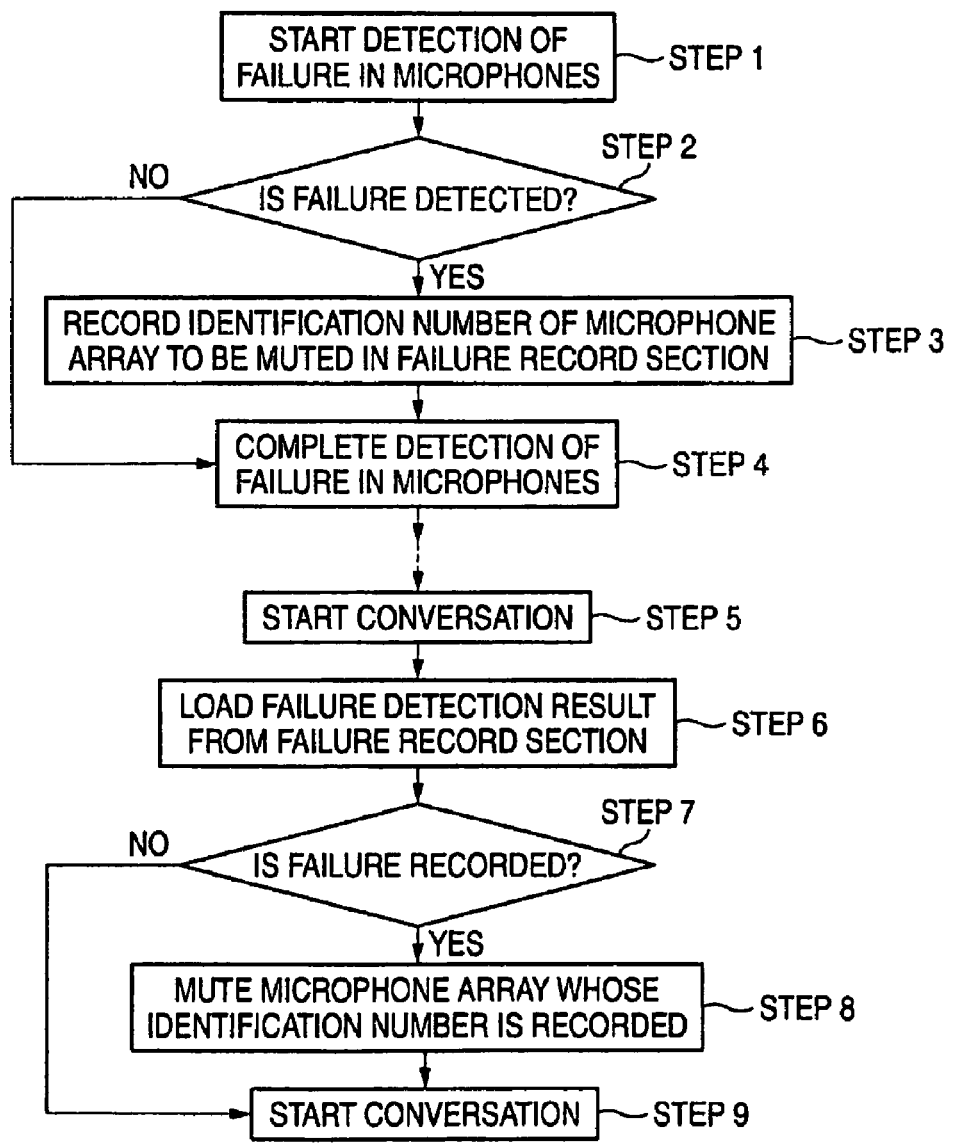
FIG. 14 is an operation flowchart of the fourth embodiment of the present invention.

An example operation of the fourth embodiment of the present invention will be described by reference to a flowchart shown in FIG. 14. First, failure detection processing is started (Step 1). The failure detection section 2e next determines a failure in a microphone by means of the method of the first embodiment of the present invention (Step 2). When detected a failure in a microphone, the failure detection section 2e records in the failure record section 10a an identification number of a microphone array to which the microphone belongs. Even when power of the apparatus is shut off at a subsequent time, a result of failure detection 2e is recorded in the nonvolatile memory and is not lost (Step 3). Next, after all of the microphones have undergone failure determination, failure detection is completed (Step 4). A conversation is initiated (Step 5). The output section 87a loads a result of previous failure detection from the failure record section 10a (Step 6). If the failure in the microphone has been detected and if an identification number of a microphone array requiring signal interruption is recorded, processing will proceed to Step 8. If no identification number is recorded, processing will proceed to Step 9 (Step 7). The output section 87a continues, until the end of a conversation, interruption of a differential signal computed by the subtractor 86a of the microphone array with an identification number whose failure is recorded (Step 8). Finally, the conversation is completed by user operation (Step 9).

As above, so long as detection of a failure in a microphone is once performed, a signal output from a microphone array including the failure microphone can be interrupted without re-performance of failure detection until the failure is repaired next time, hence, an advantage of enhancement of reliability of the conference telephone is yielded. Although the above descriptions have been provided by use of the failure detection section 2e of the first embodiment of the present invention, the failure detection section 8d described in connection with the third embodiment may also be employed, or another failure detection section may also be used.

Fifth Embodiment

Figure 15:
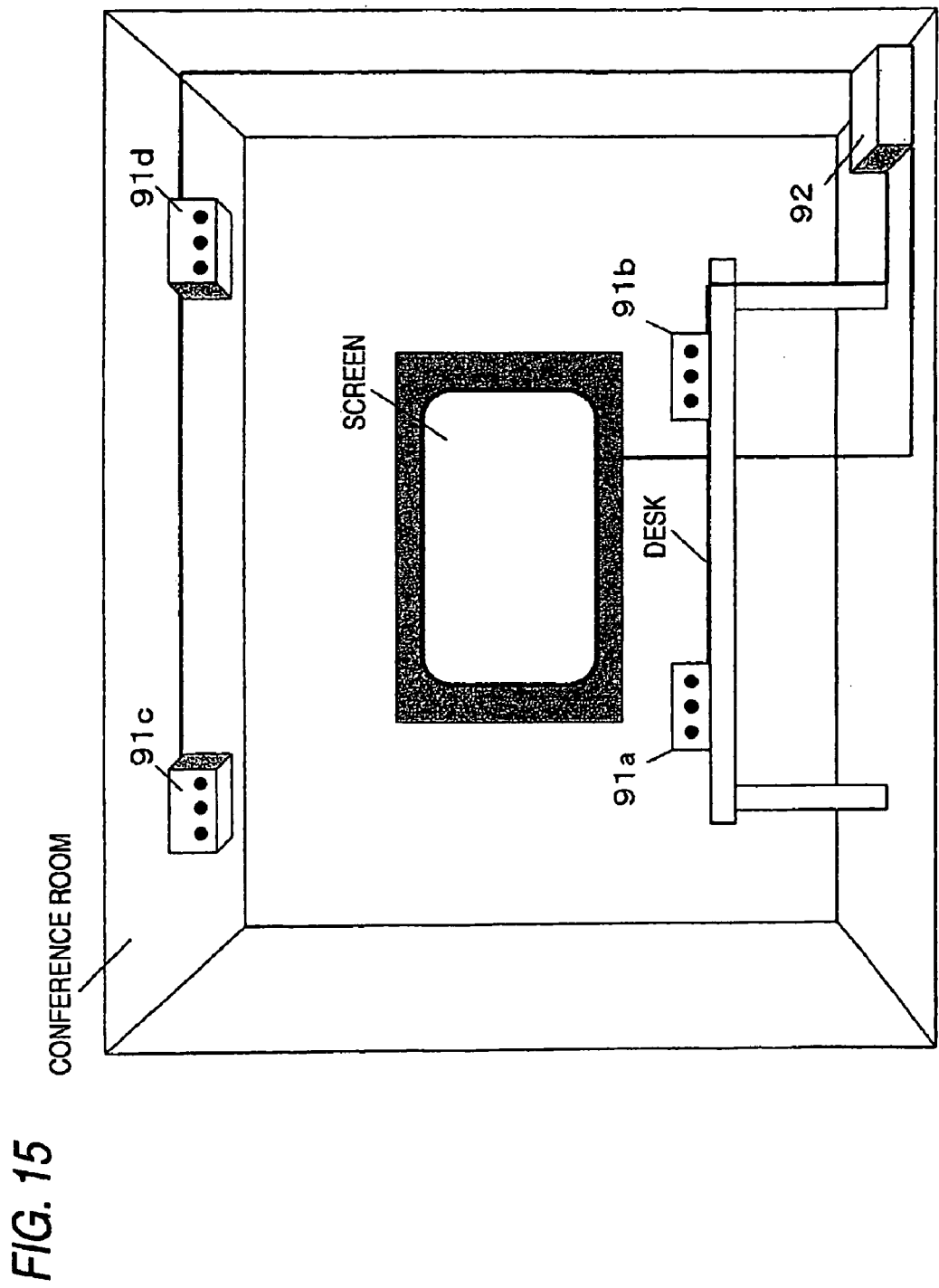
FIG. 15 is a view showing an operating status achieved in a fifth embodiment of the present invention.

A fifth embodiment of the present invention is now described by reference to FIG. 15. FIG. 15 is a schematic view of a conference room where a video conference system having a television screen and a plurality of microphone array units is installed, and reference numeral 91a designates one microphone array unit having a plurality of microphones. Additional three microphone array units 91b to 91d; namely, a total of four microphone array units, are installed on a desk and a ceiling. These microphone array units are respectively connected to a video conference system main unit 92. A conceivable method for connecting the microphone array units 91a to 91d to the video conference system main unit 92 is a daisy-chain or star connection pattern.

In each of the microphone array units 91a to 91d, a directivity generation section generates a sensitivity pattern as in the first embodiment. In the video conference system having the above configuration, each of the microphone array units produces directivity in an ambient space where the microphone array unit is installed. The video conference system main unit 92 selects a signal output from a microphone array unit having the largest voice input of a user (a speaker) by comparing signals output from these microphone array units 91a to 91d with each other, and transmits the thus-selected output signal. It is expected that a conversation with clear sound quality less susceptible to the influence of reverberation or noise of the conference room can be carried out through above operations.

However, as mentioned in connection with the first embodiment, when one of the plurality of microphones making up one microphone array unit has broken down, a great change occurs in the sensitivity of that microphone array unit when compared with the sensitivity of the other microphone array unit. As a consequence, it becomes impossible to accurately select a microphone array unit located close to the user (the speaker), which in turn poses a problem in conversation. In contrast, in the present embodiment, the failure detection section 2e provided in each of the microphone array units detects a failure in a microphone. When a failure is detected in one or more microphones, the output section 87a is controlled, to thus mute (disconnect) a signal output from the microphone array unit. Alternatively, a signal output from the microphone array is restricted to a small level.

Influence on a conversation, which would arise when the microphone element becomes failure, can be reduced through the above operations. The embodiment mentioned above is not limited to a configuration including four microphone array units but can also be likewise applied to even a configuration including two or more microphone array units.

Sixth Embodiment

Figure 16:
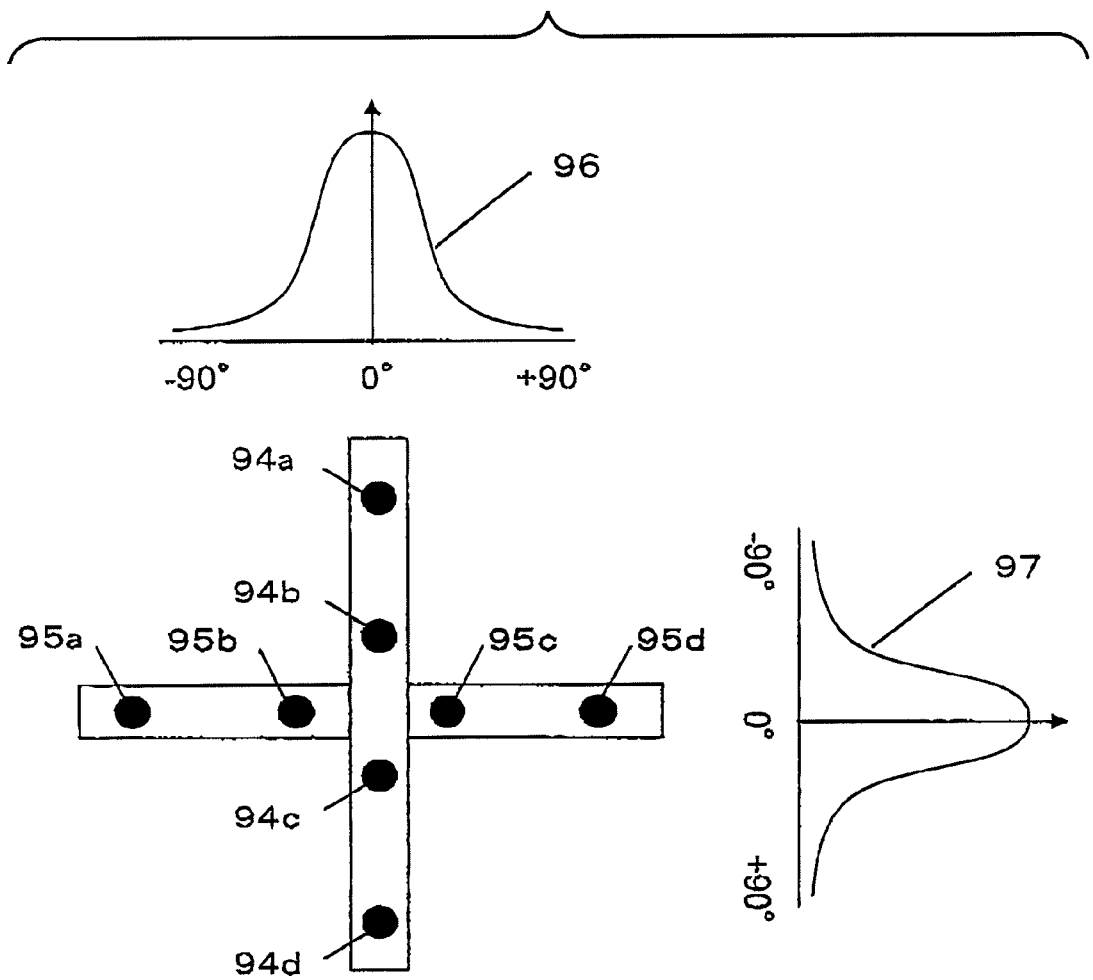
FIG. 16 is a view showing directivity of a microphone array of a sixth embodiment of the present invention.
Figure 17:
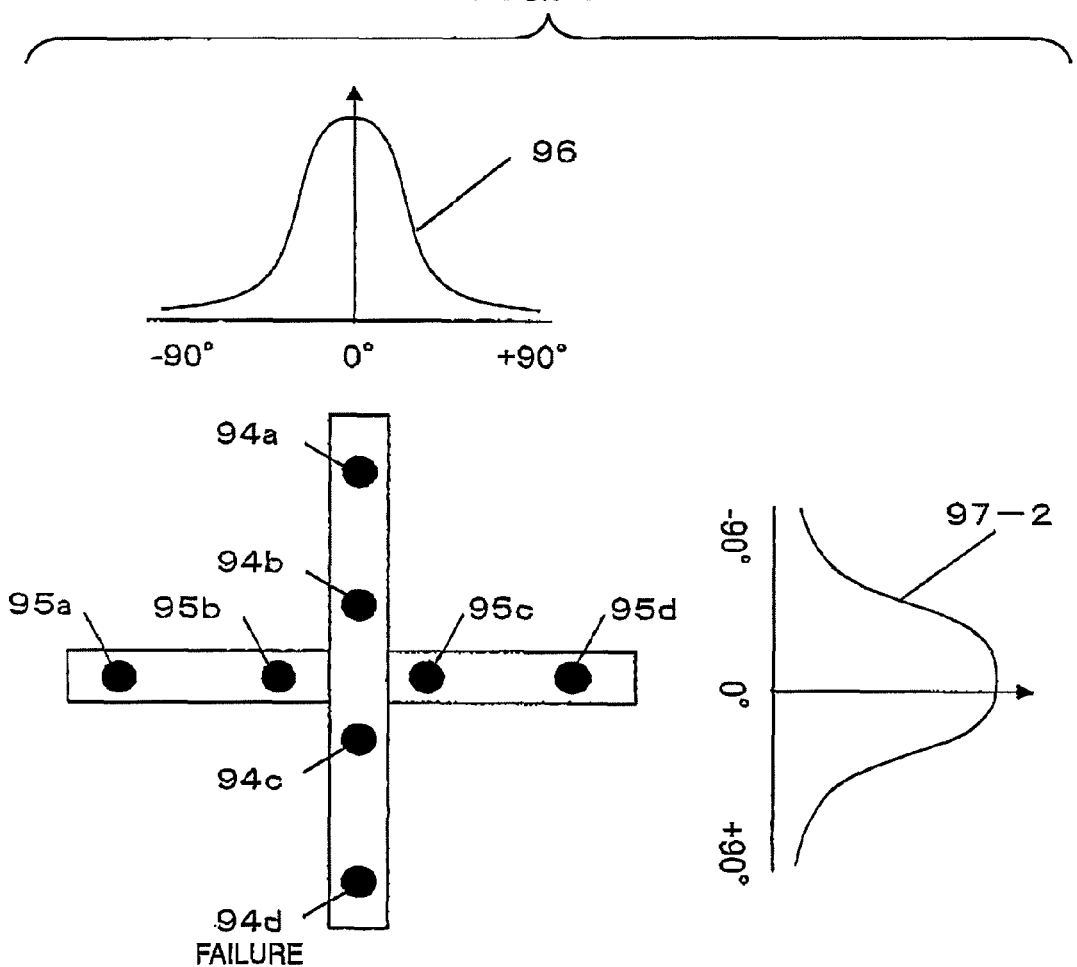
FIG. 17 is a view showing directivity of a microphone array of the sixth embodiment of the present invention.

A sixth embodiment of the present invention will be described by reference to FIGS. 16 and 17. FIG. 16 shows a pair of a four-element microphone unit in which four microphones are linearly arranged respectively, which are formed by a total of eight microphones. In the microphone unit, a horizontal directivity pattern, such as that indicated by a graph 96, is generated by delaying and summation of signals from horizontally-arranged microphones 95a to 95d. Further, vertical directivity, such as that indicated by a graph 97, is generated by delaying and summation of signals from vertically-arranged microphones 94a to 94d. A sensitivity characteristic whose directivity becomes stronger in an arbitrary direction can be produced from axes crossing at right angles the vertical and horizontal microphone arrays by combination of both directivity patterns.

The microphone array having such a geometry is used for the purpose of estimating a sound emission source. The microphone array intended for such an application must have a match between its vertical angular resolution and horizontal angular resolution. However, if one of the vertically-arranged microphones 94a to 94d breaks down, the sensitivity characteristic of the graph 97 assumes a spread geometry, such as that indicated by a graph 97-2 shown in FIG. 17, as a result of which vertical angular resolution is deteriorated.

As a result, a difference occurs between the vertical angular resolution and the horizontal angular resolution, so that a problem arises in detecting operation in a direction where a signal arrives.

After having estimated the emission source of sound, the conference telephone collects sound toward its emission source; namely, a call originator. At that time, an orientation of the directivity pattern in which sound is collected in consideration of the previously-known location of the speaker and the location of the call originator, is determined.

Accordingly, in this case, a correction is made to vertical and horizontal angular resolution by muting (disconnecting) one of the horizontally-arranged microphones 95a to 95d, whereby the influence of an error in detection of the orientation can be reduced. As a result, an increase in acoustic echo can be restricted.

Figure 18:
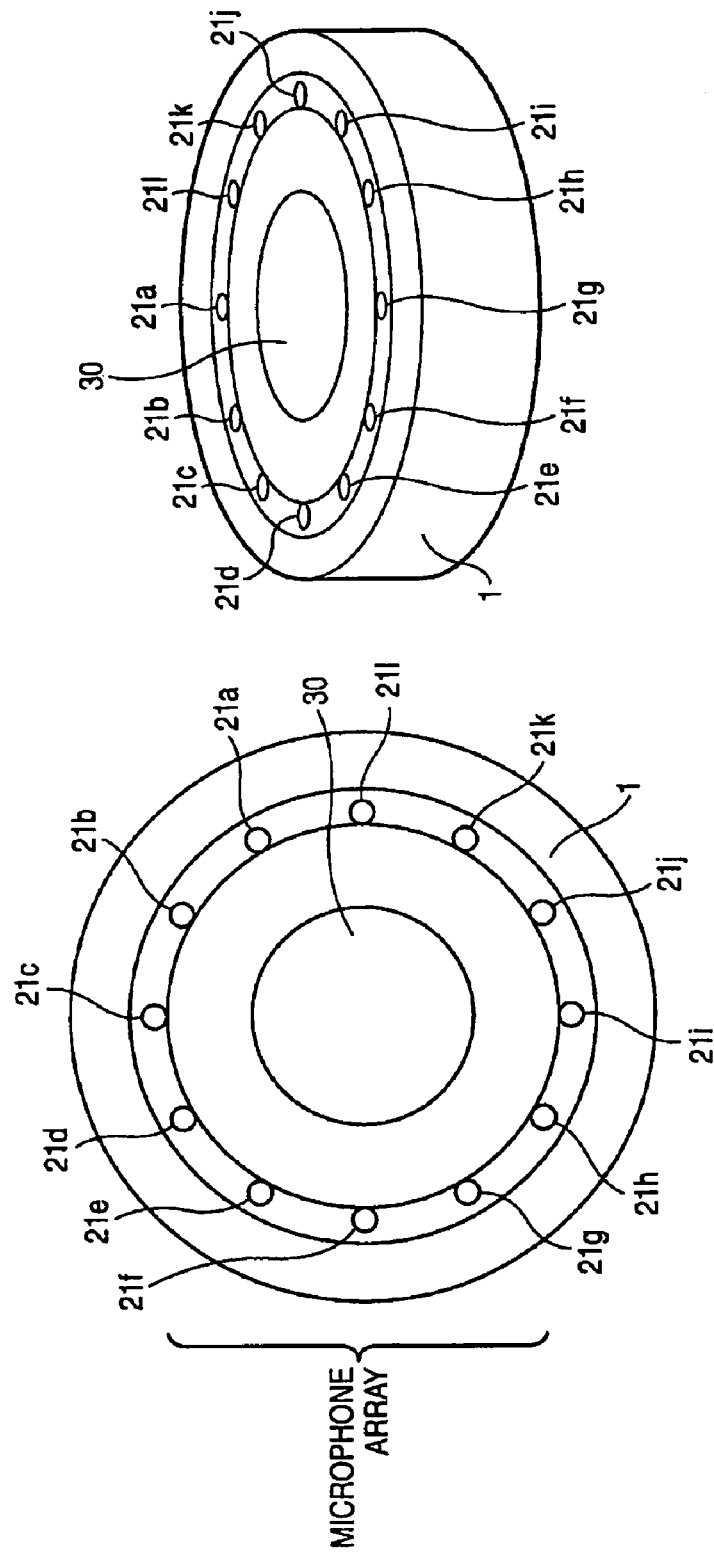
FIG. 18 is an another layout drawing of microphones of the microphone array of the sixth embodiment of the present invention.
Figure 19:
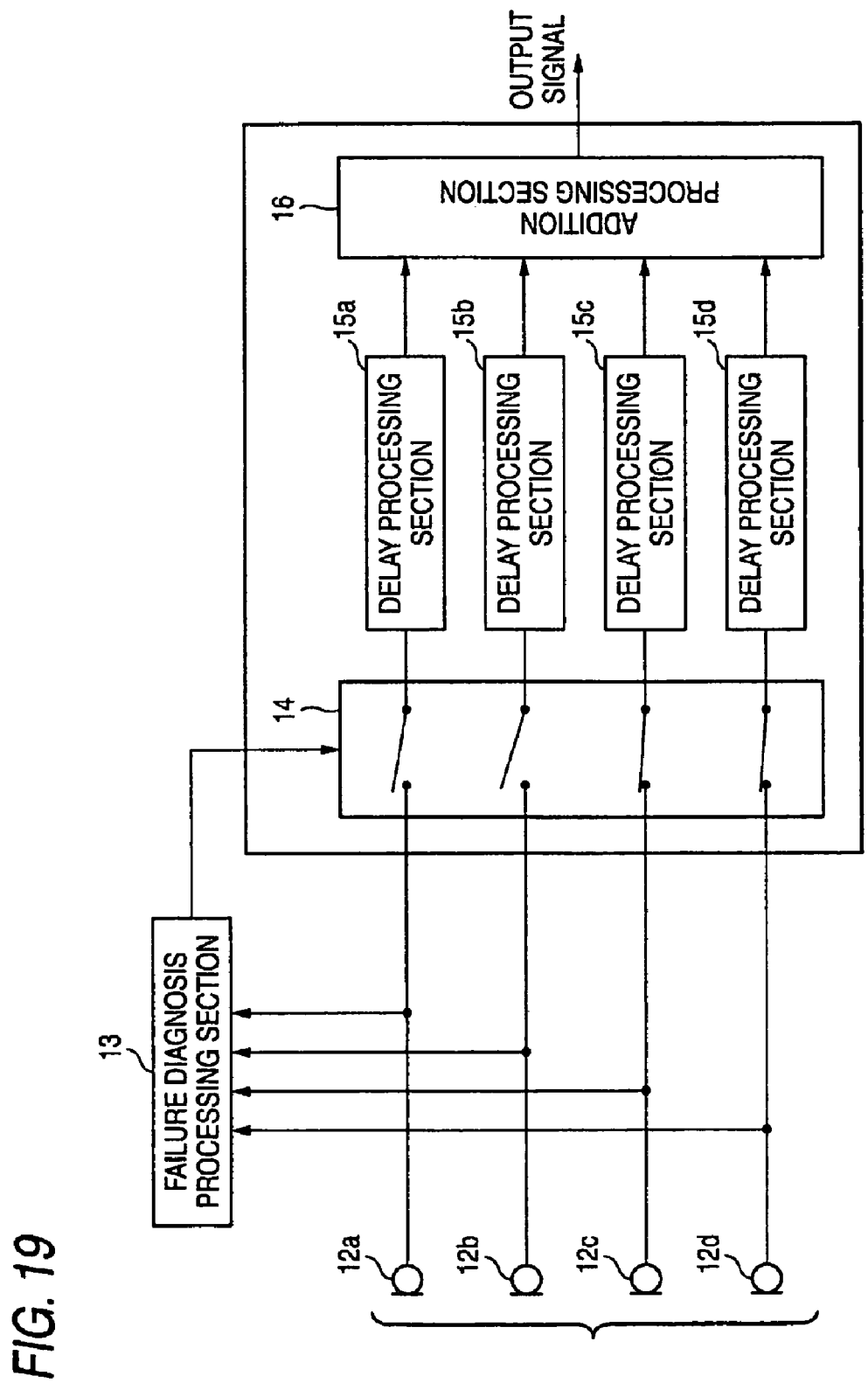
FIG. 19 is a block diagram of a related-art sound pickup apparatus.

The other microphone array comprised of microphone 101a, 101a, 101c, . . . , 101l is shown in FIG. 18. Also, the speaker 30 is arranged within the conference telephone 1 as similar to the configuration of the conference telephone 1 according to the first embodiment. The microphone array is arranged in a circular pattern in order to make a correction to the sensitivity characteristic in which directivity in an arbitrary direction becomes stronger when one of microphones of the microphone array breaks down, an increase in acoustic echo can be restricted by means of a limitation performed so as to stop or reduce to small levels signals output from microphones other than the broken microphone.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The sound pickup apparatus and the conference telephone of the present invention prevent occurrence of an increase in alarm echo by interrupting an output from a microphone array if any one of two microphones making up the microphone array has broken down. Hence, the sound pickup apparatus and the conference telephone can be utilized for; for instance, a telephone set, a voice conference system, a TV conference system, and the like.

The present application is based on Japanese Patent Application No. 2008-107674 filed on Apr. 17, 2008, the contents of which are incorporated herein for reference.

What is claimed is:

1. A sound pickup apparatus, comprising:
a plurality of microphones; and
a controller that receives signals from the plurality of microphones,
wherein when the controller detects a failure in one microphone of the plurality of microphones based on the signals received from the plurality of microphones, the controller restricts a signal from at least one remaining non-failure microphone.

2. The sound pickup apparatus according to claim 1, further comprising:
a delay section that delays a signal from at least one microphone of the plurality of microphones to output a delayed signal,
wherein when the controller detects no failure in any one microphone of the plurality of microphones, the controller adds delayed signals having different delays respectively output from the delay section to output an added signal.

3. The sound pickup apparatus according to claim 1,
wherein a plurality of microphone sets are configured by the plurality of microphones, each of the microphone sets includes at least two microphones; and
wherein when the controller detects a failure in one microphone of the at least two microphones comprising a microphone set, the controller restricts a signal from a remaining non-failure microphone in the microphone set having the failure microphone and outputs signals from at least one microphone set of the plurality of microphone sets which does not have the failure microphone.

4. The sound pickup apparatus according to claim 3, further comprising:

amplification sections connected to each of the plurality of microphone sets, respectively, wherein when the controller detects the failure in one microphone of the plurality of microphones and restricts the signal from the remaining non-failure microphone in the microphone set having the failure microphone, the controller increases gains of the amplification sections as compared with a case where the failure is not detected.

5. A conference telephone, comprising:

a loudspeaker that outputs a voice of a party in communication with the conference telephone over a network; and the sound pickup apparatus according to claim 1 that receives an input of the voice output from the loudspeaker and that applies a delay to the input of the sound pickup apparatus so as to reduce a sensitivity to the loudspeaker.

* * * * *